3,042,489
PRODUCTION OF SULFURIC ACID

Eugene W. Schoeffel, Kronenwetter, Wis., assignor to Sterling Drug Inc., New York, N.Y., a corporation of Delaware
No Drawing. Filed Nov. 20, 1958, Ser. No. 775,126
6 Claims. (Cl. 23—167)

This invention is directed to a process for the production of sulfuric acid and is more particularly concerned with a non-catalytic process for the production of sulfuric acid in high yield by oxidizing sulfur in an aqueous dispersion to sulfur trioxide at a temperature between about 275 and 360 degrees centigrade and under a pressure sufficient to maintain some of the water in liquid phase and recovering sulfuric acid from the oxidized product. The invention is also directed to processes for concentrating sulfuric acid.

This application is a continuation-in-part of my copending application Serial 391,754, filed November 12, 1953, now abandoned.

The art of producing sulfuric acid is one of the oldest techniques of chemistry. Extensive research has been directed to the production of this material, and there are, in general, two types of procedures utilized in modern day industry for its production. The older procedure in point of time is called the lead "chamber process" and involves the oxidation with nitrogen dioxide of sulfurous acid prepared by burning sulfur in air and subsequently dissolving the resulting sulfur dioxide in water. The nitrogen dioxide is reduced to nitric oxide which, in the presence of oxygen, will regenerate to nitrogen dioxide. Upon the reduction of the nitrogen dioxide, the sulfurous acid is oxidized to sulfuric acid. However, the loss of the oxides of nitrogen constitutes an appreciable item of expense in the cost of manufacture utilizing this procedure. As a result, the more preferable modern day procedure is the "contact process." This involves the mixing of oxygen and sulfur dioxide in the presence of vanadium compounds of finely divided platinum. While the efficiency of this procedure has been developed to a high degree, the dissipation and losses of the catalyst employed contribute to an increase in the production cost of the sulfuric acid, as well as pose the problem of obtaining a sufficient amount of catalytic material to establish and maintain the process.

It is, therefore, a principal object of the present invention to provide a procedure for the production of sulfuric acid which does not require the presence of a catalyst. Another object of the present invention is to provide a procedure for the direct oxidation of sulfur to sulfur trioxide, which in turn is contacted with water to form sulfuric acid. Another object is to provide a process for making sulfuric acid which presents no air pollution problems. Another object of the present invention is to accomplish the liquid phase oxidation of sulfur to sulfur trioxide, and, concomitantly, to sulfuric acid. Still a further object of the present invention is to accomplish such oxidation at temperatures in excess of about 275 degrees centigrade and under pressures of above about 800 pounds per square inch, which pressures are sufficient to keep at least some of the water in liquid phase.

The foregoing and additional objects have been accomplished by the provision of the herein described procedure and process whereby sulfuric acid may be produced directly from sulfur without the need of using a catalyst. This invention contemplates that sulfur will be mixed with water, and the aqueous mixture placed in a suitable acid-resistant reactor and heated to at least about 275 degrees centigrade, under at least 800 pounds per square inch pressure and in the presence of a suitable source of oxygen, preferably a gas containing free oxygen, whereby the sulfur is oxidized to sulfur trioxide and dissolved in the water to form sulfuric acid. In order that the reaction may be completed, it is essential that at least some of the water present be in the liquid phase. It may thus be seen that no catalyst or other materials are required for the direct production of sulfuric acid from sulfur and oxygen and water. The minimum temperature required for the production of sulfuric acid at a high percentage conversion from sulfur is about 275 degrees centigrade. The maximum temperature is about 360 degrees centigrade (which approaches the decomposition point of sulfuric acid and also the critical temperature of water in liquid form). The pressure within the reactor must be maintained at at least about 800 pounds per square inch gauge. The pressure used should be roughly about at least the steam pressure corresponding to the temperature used and must be high enough that at least some of the water in the reactor remains in liquid phase. The maximum pressure which may be employed will be dependent upon the particular reaction apparatus used.

The oxygen is preferably introduced as air, but other gaseous sources of free oxygen may be employed. Thus, free oxygen per se is a suitable material, but the expense of this as a reactant is presently somewhat prohibitive and as a result, air is the preferred source of oxygen. The oxygen must be employed in an amount in excess of that theoretically required to convert all of the sulfur to sulfur trioxide and is preferably employed in at least a molar excess. Where the term gaseous oxygen is used in the specification and claims, it is intended to cover air as well as other gaseous sources of free oxygen.

The sulfur used may be in the form of ground or paste sulfur (or be molten) and should have a relatively small particle size when introduced in the aqueous slurry. Thus, it is contemplated that any sulfur which has a particle size sufficiently small to be pumped in conventional pumping apparatus for the water will be suitable in the process of the present invention. The amount of water to be employed will be that amount which is at least four times the amount of sulfur employed, by weight, and will preferably be at least ten times the amount of sulfur employed. Thus, a large excess of water is preferable both to form the reaction media, and to react with the sulfur trioxide to form sulfuric acid.

It is a specific embodiment of the process of the present invention that colloidal sulfur in water, obtained by the Frasch process for extracting sulfur from its natural deposits, will be introduced directly into an oxidation reactor as above-described without the necessity of evaporation and drying of the sulfur. Thus, sulfuric acid may be produced directly from the aqueous suspension derived from a sulfur well and no intermediate steps are required. Where salt water serves as the suspending agent, the suspension is fed directly to a reactor utilizing the process of the present invention, and the products will be hydrochloric acid and sodium sulfate. The hydrochloric acid can be separated in conventional manner as by distilling out an azeotropic mixture of the acid and water. The hydrochloric acid obtained is usually a 20 percent solution, and its production is obtained in a clean operation without fumes, odors, or health hazards present in the old Le Blanc process.

An inherent advantage in the operation of the procedure of the present invention is that, since the reaction is exothermic, no provisions for external heating of the reactor are required and consequently, reactor construction costs are substantially reduced. However, it must be noted that both sulfuric acid and hydrochloric acid are extremely corrosive and proper equipment choice is essential to the success of the operation of this procedure.

When either sulfuric acid or hydrochloric acid have been produced, it is often desirable that they be concentrated. This is readily accomplished by heating to cause distillation of the reaction product. The concentrated acids, which are distilled may then be condensed and collected. Preferably, excess exothermic heat from the reaction may be utilized to accomplish this distillation. The sulfuric acid or hydrochloric acid may also be obtained in a more concentrated form by venting steam from the reactor, or by recycling the acid back to the reactor and using the dilute acid in place of water.

An additional advantage of the present invention involves the consideration that impure sulfur slurries may be introduced directly into the reactor. Any insoluble inorganic material which is present can be periodically removed from the bottom of the reactor, which soluble inorganic contaminants will be oxidized and carried with the sulfuric and/or hydrochloric acid and will be removed during the purification step. Of course, organic material will be completely oxidized to carbon dioxide and steam and does not present a problem. It is thus seen that even though an impure sulfur slurry is used, the process of the present invention allows the production of a substantially pure acid, and the impurities do not affect the catalysts, since there are no catalysts employed or required.

The reaction of the present invention may be preferably employed as a continuous procedure with a bleeding of the sulfuric acid from the reactor.

The reaction is exothermic, and once initiated will maintain itself without the additional application of heat or pressure. In fact, there is sufficient energy liberated by the reaction, so that it is possible to recover some heat and power from the reaction which may be utilized in any preferred manner.

The reactors to be used should have an acid-resistant lining e.g. be glass-lined, tantalum-lined, acid-resistant brick-lined, etc.

The following examples are given to illustrate the process of the present invention, and are not to be construed as limiting the invention:

EXAMPLE 1

The reactor used was a tantalum-lined stainless steel high pressure reactor equipped so that the raw materials could be added as desired, steam vented off, and the end product sulfuric acid removed from the system or recycled back into the reactor. A dispersion of 32 parts by weight of sulfur in 1000 parts by weight of water was charged into the reactor, as was 250 parts by weight of air. The reactor was then heated and operated at a temperature of 300 degrees centigrade and a pressure of 2000 pounds per square inch gauge. Steam was flushed from the top of the reactor, part of the sulfuric acid formed therein was removed from the bottom of the reactor, and additional raw materials were added so that the desired reaction conditions were continuously maintained. The sulfuric acid solution thus removed was a 12.6 percent sulfuric acid solution, and the conversion of sulfur to sulfuric acid was virtually quantitative.

EXAMPLE 2

Using the same equipment as in Example 1, the procedure of Example 1 was repeated except that the charge consisted of 37.2 parts by weight of sulfur dispersed in a mixture of 1180 parts by weight of 50 percent sulfuric acid (recycled from a previous run) and 410 parts by weight of additional water, with 288 parts by weight of air. The reactor was operated at 300 degrees centigrade under a pressure of 2000 pounds per square inch gauge. There resulted 1372 parts by weight of 50 percent sulfuric acid and 296 parts by weight of steam. The steam was vented off. Of the total 1372 parts of 50 percent sulfuric acid in the reactor 192 parts were withdrawn from the system and 1180 parts recycled to be mixed with 37.2 parts by weight of sulfur, and 410 parts by weight of additional water.

By following the above procedure, but adjusting the amounts of charged materials and the amount of recycled sulfuric acid, other desired concentrations of sulfuric acid are produced.

The following comparative Examples 3-8, illustrate the criticality of using a temperature above about 275 degrees centigrade to carry out the oxidation reaction in order to obtain high conversion yields of sulfuric acid based on the amount of sulfur used. The reaction conditions in Examples 3-8 are the same except for the reaction temperature which varied in each example, and also that in Example 8, a dilute sulfuric acid was used in place of the amount of water used in Examples 3-7:

EXAMPLES 3-8

Into a glass-lined stainless steel pressure reaction vessel (160 milliliters capacity) there was charged a mixture of 0.96 gram of sulfur dispersed in 30 milliliters of water (one gram-mole of sulfur per liter of water) and also 19.8 liters of air (at standard temperature and pressure). The reaction vessel was then sealed, and heated for one hour at a temperature of: 150 degrees centigrade in Example 3; 200 degrees centigrade in Example 4; 250 degrees centigrade in Example 5; 275 degrees centigrade in Example 6; 300 degrees centigrade in Example 7; and, 300 degrees centigrade in Example 8 (in which latter example 30 milliliters of dilute, 4.04 molar sulfuric acid was used instead of water). The reaction vessel was then cooled to room temperature and its contents analyzed (the solid contents were dried at 105 degrees centigrade, before being weighed and analyzed), with the analytical results for Examples 3-8 being as shown in the following chart:

|  | Oxidation of One Mole of Sulfur per liter of Water | | | | | Oxidation of One Mole of Sulfur per liter of 4.04 M $H_2SO_4$, Example 8 |
| --- | --- | --- | --- | --- | --- | --- |
|  | Example 3 | Example 4 | Example 5 | Example 6 | Example 7 |  |
| Oxidation Temperature, degrees C | 150 | 200 | 250 | 275 | 300 | 300 |
| Time at Temperature, Minutes | 60 | 60 | 60 | 60 | 60 | 60 |
| Sulfur Charged, g./l | 32.0 | 32.0 | 32.0 | 32.0 | 32.0 | 32.0 |
| Recovered Solution: |  |  |  |  |  |  |
| Molarity of Acid (Corrected to Starting Volume) | 0.015 | 0.101 | 0.514 | 0.974 | 0.991 | 4.89 |
| Concentration of $H_2SO_4$ percent | 1 | 1.0 | 4.9 | 9.0 | 9.2 | 37.4 |
| percent Sulfur Oxidized to Sulfuric Acid | 1.5 | 10.1 | 51.4 | 97.4 | 99.1 | 85.0 |
| Sulfate Sulfur, g./l | 0.5 | 3.4 | 17.2 | 32.6 | 32.9 | 157.7 |
| Sulfur Compounds Reactive to Iodine | Trace | None | None | None | None | None |
| Recovered Plastic Sulfur: |  |  |  |  |  |  |
| Weight of Plastic Sulfur Recovered, g./l | 31.1 | 27.5 | 15.5 | 0.3 | None | 5.7 |
| percent Sulfur in Recovered Solid, g./l | 99.9 | 100.4 | 98.8 | 96.8 | -------- | 98.8 |
| percent of Charge Sulfur Recovered as Plastic Sulfur, g./l | 97.3 | 86.0 | 47.8 | 0.9 | 0.0 | 17.6 |
| Total Sulfur Recovered as Plastic Sulfur and $H_2SO_4$, percent of Charge | 98.2 | 96.1 | 99.2 | 98.3 | 99.1 | 102.6 |

As may be seen from the previous chart, conducting the oxidation reaction at 150 degrees centigrade gave a 1.5 percent conversion of sulfur to sulfuric acid while use of 200 degrees centigrade gave a 10.1 percent conversion; use of 250 degrees centigrade gave only a 51.4 percent conversion. However when temperatures of 275 degrees centigrade and 300 degrees centigrade were used, the percentage conversion of sulfur to sulfuric acid rose sharply to 97.4 percent and 99.1 percent respectively. This indicates the criticality of the use of temperatures close to 275 degrees centigrade or above in order to obtain any great percentage conversion of sulfur to sulfuric acid.

In Example 3, the solution recovered had a hydrogen sulfide odor and gave a slight positive sulfide test with lead acetate paper. No such odor was noted in Examples 4–7, which shows that hydrogen sulfide was not an intermediate in the reactions and indicates that at the higher temperatures the sole intermediate is sulfur trioxide.

Example 8, the results of which also appear in the above table, illustrates the use of the present invention to oxidize sulfur in the presence of dilute sulfuric acid, thereby obtaining a more concentrated sulfuric acid. The conditions were exactly as described for Examples 3–7, except that in place of the 30 milliliters of water, 30 milliliters of 4.04 molar (32.0 percent) sulfuric acid was used. The reaction was run at a temperature of 300 degrees centigrade for one hour, and the resulting sulfuric acid obtained was 4.89 molar (37.4 percent) sulfuric acid, with the percentage conversion of sulfur to sulfuric acid being 85 percent. It is thus apparent that concentrated sulfuric acid can be obtained by recycling the dilute sulfuric acid and introducing fresh sulfur and air or having several reactors in series and introducing fresh sulfur and air in each reactor.

It should be noted that the process of the present invention may be preferably employed as a continuous system. This is advantageous in that, a portion of the water present is flashed and can be separated as steam and removed, so that the sulfuric acid solutions obtained will be more concentrated than the sulfuric acid solutions described in Examples 6 and 7 above. Thus, comparing the data from Example 7, which was run at 300 degrees centigrade, oxidation of one mole of sulfur per liter of water resulted in a 9.2 percent sulfuric acid solution. Now: 1 mole per liter is equal to 0.267 pound per gallon of water; one pound of sulfur theoretically requires 1.5 pounds of oxygen or 6.46 pounds of air for its total oxidation to sulfuric acid. Therefore 0.267 pound of sulfur require 1.74 pounds of air for the oxidation reaction. In the continuous system when operated at a temperature of 300 degrees centigrade and a pressure of 2000 pounds per square inch gauge, one pound of air contains 1.44 pounds of water as steam, and 1.74 pounds of air contains 2.51 pounds of water as steam. It is the removal of this water in the form of steam, which results in a more concentrated sulfuric acid remaining within the reactor from which it can be easily removed. In this continuous system the input per gallon of water is: 0.267 pound of sulfur; 8.34 pounds of water; and, 1.74 pounds of air. The output per gallon of input water from the continuous system is: 0.82 pound of sulfuric acid; 2.51 pounds of steam; 0.15 pound of water (required to produce 0.82 pound of sulfuric acid); and, 5.68 pounds of liquid water. The resulting solution of 5.68 pounds of water and 0.82 pound of sulfuric acid corresponds to a 12.6 percent sulfuric acid solution. This concentration, obtained from a continuous system, is more concentrated than the 9.2 percent solution obtained from the corresponding non-continuous system. This is shown in Example 1. By recycling the dilute sulfuric acid solutions obtained, as in Example 8, but using a continuous system in which additional sulfur and gaseous oxygen are charged into the system as needed, even more highly concentrated sulfuric acid solutions are obtained. This is shown in Example 2.

The following Examples 9 and 10 are given to illustrate the tremendous difference in conversion of sulfur at 200 degrees centigrade and 300 degrees centigrade, using a tantalum lined acid-resistant reactor and 0.5 mole of sulfur per liter of water.

EXAMPLE 9

Oxidation at 300 Degrees Centigrade

One-tenth mole (3.2 grams) of a technical grade elemental sulfur, ground to pass an 80 mesh screen was placed in an 800 milliliter tantalum-lined autoclave. Two hundred milliliters of distilled water were added and the autoclave closed. Compressed air analyzing 21.0 percent oxygen was then admitted from a calibrated reservoir until the equivalent of 22.52 liters at S.T.P. (standard temperature and pressure) was delivered. The autoclave was then placed in a shaker-heater, heated to 300 degrees centigrade and held one hour. After cooling the autoclave to room temperature, the residual gas was exhausted through a meter. The gas analyzed 8.5 percent oxygen and amounted to 24.23 liters at 731.6 millimeters and 25 degrees centigrade or 21.39 liters at S.T.P. (standard temperature and pressure). The autoclave was then opened, the contents removed and the bomb washed with distilled water. There was thus obtained 237 milliliters of a clear, water white liquid. Titration with standard sodium hydroxide showed the solution to be .82 normal or equivalent to 13.12 grams per liter sulfur in the form of $H_2SO_4$. A standard gravimetric sulfate determination with barium chloride showed 13.2 grams per liter sulfur in the form of barium sulfate. A small amount of plastic sulfur was found imbedded in the crevice formed by the flat ring seal in the autoclave head. This amounted to 0.14 gram.

The sulfur balance is as follows:

|  | grams | Percent of Charge |
|---|---|---|
| 3.2 g. sulfur charged: |  |  |
| 237 ml. at 13.2 g./l. sulfate S | 3.13 | 97.8 |
| Plastic sulfur (in crevice—not reacted) | .14 | 4.4 |
|  | 3.27 | 102.2 |

Thus of the sulfur charged 97.8 percent was oxidized to sulfuric acid; of the sulfur reacting analysis showed 102.2 percent as sulfuric acid.

EXAMPLE 10

Oxidation at 200 Degrees Centigrade

The apparatus and procedure were exactly the same as in Example 9, except that the autocalve was heated to only 200 degrees centigrade, for one hour.

The charge of sulfur was 3.2 grams and of air was 27.35 liters at standard temperature pressure. After reaction the residual gas amounted to 32.01 liters at 726 millimeters and 26 degrees centigrade or 27.90 liters at standard temperature and pressure and analyzed 18.4 percent oxygen.

The liquor was removed without dilution and amounted to 200 milliliters. The standard sodium hydroxide titration showed the solution to be 0.22 normal or equivalent to 3.52 grams per liter sulfur in the form of sulfuric acid. The gravimetric determination with barium chloride gave 3.5 grams per liter of sulfur in the form of barium sulfate.

Unreacted sulfur was recovered as a solidified melt of the rhombicmonoclinic type and amounted to 2.50 grams.

The sulfur balance was as follows:

|  | Grams | Percent of charge |
| --- | --- | --- |
| 3.2 grams sulfur charged: | | |
| 200 ml. at 3.5 g./l. sulfate sulfur | .70 | 21.9 |
| Solid sulfur | 2.50 | 78.1 |
|  | 3.20 | 100.0 |

Thus 21.9 percent of the sulfur charged was oxidized to sulfuric acid and of the sulfur reacting 100 percent appeared as sulfuric acid.

As may be seen from Examples 9 and 10 using a tantalum-lined reactor, conducting the oxidation reaction at 200 degrees centigrade gave a 21.9 percent conversion of sulfur to sulfuric acid, while the use of a 300 degrees centigrade temperature gave a 97.8 percentage conversion, again illustrating the criticality of using temperatures above about 275 degrees centigrade in order to obtain relatively quantitative conversions.

The use of an acid-resistant reactor is critical if high conversion percentages of sulfur to sulfuric acid are to be attained, even when very high temperatures are used. This is shown by the following Examples 10 and 11 wherein a non-acid resistant reactor was used and the percentage conversions at 300 degrees centigrade was only 32.2 percent, the same as obtained for a 250 degree centigrade reaction temperature.

EXAMPLE 11

*Oxidation at 250 Degrees Centigrade in Non-Acid-Resistant Reactor*

Elemental sulfur (2 grams), mixed with 100 milliliters of water, was placed in a stainless steel autoclave (316 S.S.) and heated in the presence of 15 grams of oxygen gas. The total heating time was 55 minutes, with the duration of heating at the desired reaction temperature of 250 degrees centigrade being 30 minutes. After the reactor had cooled, analysis of the contents showed: 1.5 grams of elemental sulfur recovered and 1.9 grams of sulfuric acid had been formed. This corresponds to a 32.2 percentage conversion of sulfur to sulfuric acid.

EXAMPLE 12

*Oxidation at 300 Degrees Centigrade in Non-Acid-Resistant Reactor*

Example 11 was repeated except that the total heating time was 60 minutes, with the duration of heating at the desired reaction temperature of 300 degrees centigrade being 30 minutes. Analysis of the reactor contents showed a non-elemental sulfur containing ash, the identity of which could not be established and that 1.9 grams of sulfuric acid had been formed. This corresponds to a 32.2 percentage conversion of sulfur to sulfuric acid.

Because of the corrosive effect of sulfuric acid on stainless steel, which necessarily affects the validity of Examples 11 and 12, the procedure described in Example 9 was repeated exactly, except that 2.5 grams of sodium hydroxide was also added to the stainless steel autoclave reactor. When the reactor was emptied after completion of the reaction, no elemental sulfur was recovered, but sodium sulfate equivalent to 5.7 grams of sulfuric acid had been formed. It was at first thought that the sodium sulfate was a measure of the amount of sulfuric acid formed, but in view of the amounts of sulfuric acid formed in the other examples it is now apparent that the formation of sodium sulfate does not mean that a large percentage conversion of sulfur to sulfuric acid was affected.

It will be apparent to those skilled in the art that various modifications may be made in the processes of the present invention without departing from the spirit or scope thereof, and it is to be understood that the invention is to be limited only as defined in the appended claims.

I claim:

1. In a non-catalytic process for preparing sulfuric acid by the direct oxidation of sulfur, the steps which comprise: introducing one part of sulfur and at least four parts of water by weight into an acid-resistant reactor; introducing gaseous oxygen into said reactor, said oxygen being present in an amount in excess over that amount theoretically required to convert all the sulfur to sulfur trioxide; maintaining the reactor contents at a temperature between about 275 and 360 degrees centigrade and under a pressure of at least 800 pounds per square inch; and separating sulfuric acid from the reaction product.

2. A non-catalytic process for preparing sulfuric acid by the direct oxidation of sulfur, comprising: maintaining in an acid-resistant reactor, an aqueous sulfur mixture having at least ten parts by weight of water per part of sulfur, in the presence of at least a molar excess of gaseous oxygen over that amount theoretically required to convert all the sulfur to sulfur trioxide, at a temperature between about 275 and 360 degrees centigrade and under a pressure of at least 800 pounds per square inch, until substantially no elemental sulfur remains, thereby obtaining sulfuric acid in high yield based on the amount of sulfur used.

3. A non-catalytic process for preparing a more concentrated sulfuric acid from a less concentrated sulfuric acid which comprises: heating, in an acid resistant reactor, a mixture of elemental sulfur in dilute sulfuric acid solution, in the presence of an excess of gaseous oxygen over that amount theoretically required to convert all the elemental sulfur to sulfur trioxide, at a temperature between about 275 and 360 degrees centigrade and under a pressure of at least 800 pounds per square inch, until substantially no elemental sulfur remains, thereby obtaining sulfuric acid more concentrated than the starting sulfuric acid.

4. In a continuous, non-catalytic process for preparing sulfuric acid by the direct oxidation of sulfur, the steps which comprise: introducing an aqueous sulfur mixture having at least four parts by weight of water per part of sulfur into an acid-resistant reactor; introducing gaseous oxygen into said reactor in an amount at least a molar excess over that amount theoretically required to convert all the sulfur present to sulfur trioxide; heating the reactor contents at a temperature between about 275 and 360 degrees centigrade, and under a pressure of at least 800 pounds per square inch thereby converting the sulfur to sulfuric acid; periodically venting steam from the reactor; periodically removing some of the sulfuric acid produced therein from the reactor; and, introducing additional aqueous sulfur mixture and gaseous oxygen into the reactor.

5. A non-catalytic process for preparing sulfuric acid by the direct oxidation of sulfur, comprising: heating, in an acid-resistant reactor, an aqueous sulfur mixture having at least ten parts by weight of water per part of sulfur, in the presence of at least a molar excess of gaseous oxygen over that amount theoretically required to convert all the sulfur to sulfur trioxide, at a temperature between about 275 and 360 degrees centigrade and under a pressure of at least 800 pounds per square inch, until substantially no elemental sulfur remains thereby obtaining sulfuric acid; venting steam from the reactor, and removing the sulfuric acid formed therein from the reactor.

6. A continuous, non-catalytic process for preparing sulfuric acid by the direct oxidation of sulfur which comprises: introducing a mixture of elemental sulfur in sulfuric acid solution into an acid-resistant reactor together with an excess of gaseous oxygen over that amount theoretically required to convert all the elemental sulfur to sulfur trioxide; maintaining the reactor contents at a temperature between about 275 and 360 degrees centigrade, and under a pressure of at least 800 pounds per square inch; removing sulfuric acid solution from the reactor; withdrawing part of this removed sulfuric acid solution from the system; recycling the rest of the removed sulfuric acid solution back into the reactor together with make-up sulfur, gaseous oxygen, and make-up water in an amount equal to the sulfuric acid withdrawn from the system; and, repeating the above process steps.

References Cited in the file of this patent

UNITED STATES PATENTS 816,918    Knietsch _____ Apr. 3, 1906

OTHER REFERENCES

Mellor: "Comprehensive Treatice on Inorganic & Theoretical Chemistry," Longmans, Green & Co., 1930, vol. 10, page 364.

Martin et al.: "Sulphuric Acid and Sulphur Products," Crosby Lockwood and Son, London, 1916, pages 12–13.

Manchester Literary and Philosophical Society Memoirs and Proceedings, vol. 56, 1911–12, No. 14.